A. V. JENSEN.
CEMENT PACKING MACHINE.
APPLICATION FILED OCT. 14, 1915.
1,259,993.
Patented Mar. 19, 1918.
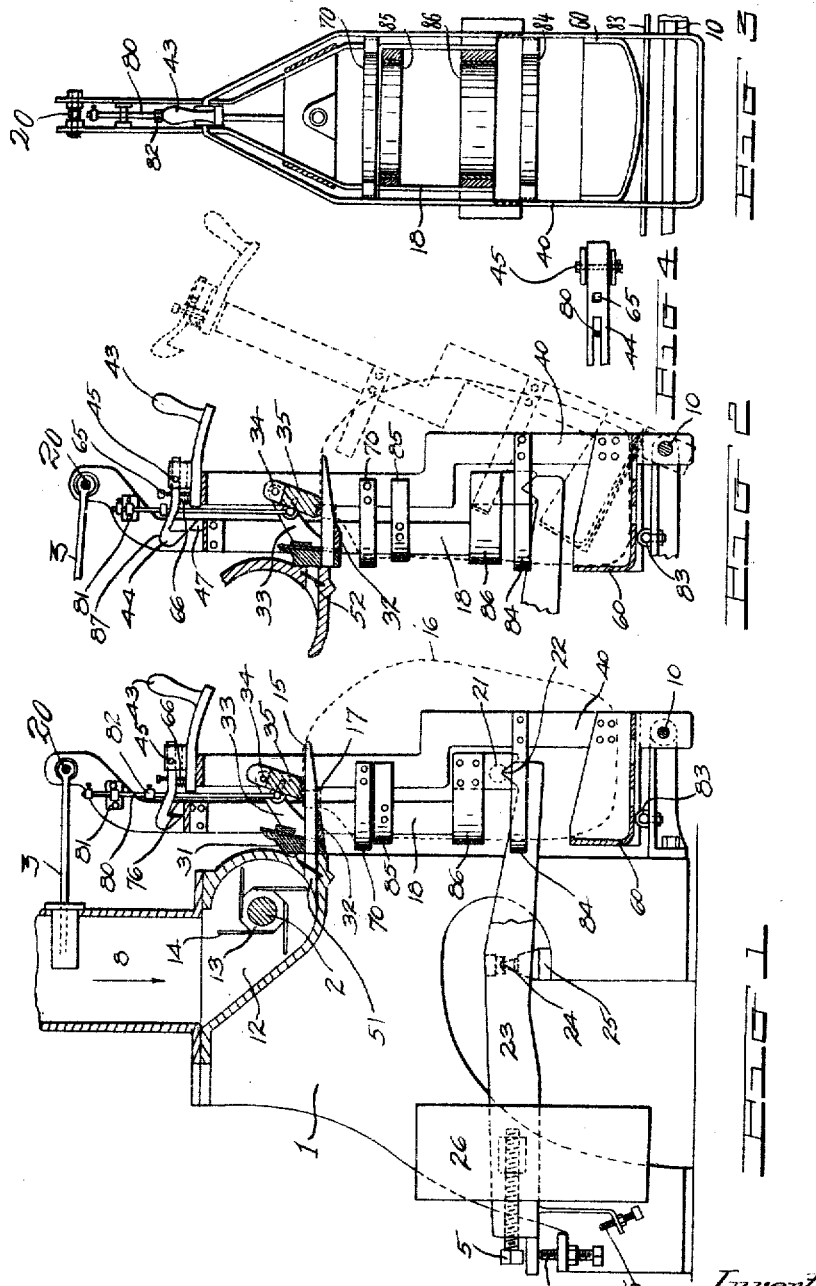
Inventor.
Alexander V. Jensen
By Ivan C. A. Koenigsberg
Atty.

UNITED STATES PATENT OFFICE.

ALEXANDER V. JENSEN, OF DEVILS SLIDE, UTAH.

CEMENT-PACKING MACHINE.

1,259,993.

Specification of Letters Patent.   Patented Mar. 19, 1918.

Application filed October 14, 1915.   Serial No. 55,844.

*To all whom it may concern:*

Be it known that I, ALEXANDER V. JENSEN, a citizen of the United States, and resident of Devils Slide, in the county of Morgan and State of Utah, have invented certain new and useful Improvements in Cement-Packing Machines, of which the following is a specification.

This invention relates to improvements in weighing mechanisms. More particularly this invention relates to an improved weighing mechanism adapted for use with cement packing and weighing machinery or other similar devices.
The object of the invention is a general improvement of the weighing mechanism itself together with provisions for the prevention of unintentional short weighing. Another object is to provide a mechanism of simple and efficient construction adapted to be attached or applied to existing machines without requiring but few, if any, changes in their construction and operation. The invention is shown as applied to a cement packing machine but is not intended to be limited to such machines.

In the cement industry it is very important that the bags in which the cement is packed and shipped contain the standard measure of the material which is usually, if not always, ninety-five pounds. The machines are operated very rapidly and it is therefore a frequent occurrence that the bags are unintentionally short weighted. It is one of the main objects of this invention to provide means preventing unintentional short weighing. Other objects will appear as this specification proceeds.

Accordingly my invention comprises such parts and combinations thereof as are hereinafter described and as illustrated in the accompanying drawing in which—

Figure 1 is a vertical sectional view of a cement packing and weighing machine embodying my invention with parts omitted and showing the various parts in the position when the cement bag is almost filled.

Fig. 2 is a similar view of the weighing mechanism showing the parts in the position when the bag of cement is completely filled and illustrates in dotted lines the operation of removing the filled bag from the machine.

Fig. 3 is a front view of the weighing mechanism, and

Fig. 4 is a plan detail view of parts shown in the other figures.

In Fig. 1 the reference numeral 1 denotes the frame of the machine. 2 is the main or feeder shaft to which power is supplied in any suitable manner, not shown. The feeder shaft revolves within a feed box 12 which is located below and forms a continuation of a hopper 8 into which the cement is fed by any suitable means, not shown. The feed shaft carries a feeder 13 comprising a plurality of blades 14. The feeder rotates at very high speed and discharges the cement into the spout 15 from the feed box 12. The spout is inserted through a valve in the bag 16 which valve is diagrammatically indicated at 17.

The bag is supported partly on the spout, but the greater weight of the bag when it is filled is supported in the bag chair 18 which is in the form of a large loop having a bottom 60 and sides 18. The sides merge at the top at 20 in a pivot which is connected to a rod 3 pivoted within the hopper 8 and whereby the chair is supported at the top.

The chair is provided with scale cups 21 on its sides 18 on the outside thereof, one on each side, by means of which the chair rests on corresponding scale points 22 on the scale beam 23, which is forked to enable it to pass on the outside of the chair as will be understood. The scale beam rests upon knife edges 24 supported on the frame at 25 and carries the weight 26, which may be adjusted by a screw 5 in threaded engagement with the weight as shown. 6 is an adjustable weight stop.

The sides 18 of the chair are connected by a bridge 31 to which the spout 15 is suitably secured by a support 32. Secured to the bridge 31 is also a clamp bracket 33 to which is pivoted at 34 a sack clamp 35 adapted to clamp the sack to the spout. All of the aforesaid parts are supported on and move with the chair.

40 is a discharge lever which is formed as an A-frame and which is movable outside the A-frame 18 and pivoted on the latter at 10. The discharge lever has two sides 40 joined by straps 70 and 84 and the bottom 60. The discharge lever has also a hook 44 at the top near the handle 43. The hook is provided with an adjustable stop 65. 66 is a spring which urges the hook 44 downwardly into engagement with a second hook

47 fixed to the chair 18. A clamp releasing rod 80 is pivoted to the sack clamp as shown and is mounted to slide on the chair in the bracket 81. 82 is an adjustable collar on the rod 80 which is adjusted a predetermined distance above the forked hook 44 through which the rod passes, so that said collar 82 is almost in contact with the part of the upper face of the hook 44 immediately below.

The bag straps 70 and 84 are set back a sufficient distance from the sides of the filled bag 16, which hangs on the spout 15 supported by bag supports 85 and 86, thus avoiding any interference with obtaining the proper weight in the bag. 83 is a stop for the bag chair 18.

The operation is as follows: The weight 26 is adjusted to counter-balance the weight of the chair with the parts thereon plus the required weight of cement to be filled in the bag. The scale beam therefore rests on stop 6 maintaining the chair in its upper position as shown in Fig. 1 with the hook 44 in engagement with the hook 47, and the spout 15 in register with the discharge opening 51 of the feed box 12. A sack is pushed in over the spout 15 and held against accidental removal by the clamp 35 as is obvious. Thereafter the cut-off slide 52, Fig. 2, is operated and cement is discharged by the feeder 13, through outlet 51, through the receiving spout 15 and bag valve 17 into the bag. When the bag is nearly full, its weight causes a downward movement of the chair against the weight 26. When the full quantity of cement has entered the bag, the weight thereof causes the chair to move to its lowermost position and the rear end of the scale beam moves up until stopped by the adjustable stop 75. The parts are then in the position shown in Fig. 2 where it will be observed that the spout 15 is out of register with the outlet 51 and also that the hook 47 has cleared the hook 44. The filled bag is now largely supported by the bottom or scoop 60.

The operator now takes hold of the handle 43 and tilts the discharge lever outwardly. During the first part of this movement, the inclined upper face 87 of the hook 44 contacts with the collar 82 and forces the rod 80 upward together with the bag clamp 35 thus automatically releasing the bag, permitting it to be removed from the spout 15 by further tilting. As soon as the bag falls out of the discharge frame, the weight 26 causes the chair to rise. The operator thereupon moves the discharge lever back into position and the bevel faces 76 on the hooks 44 and 47 slide against each other and permitting them to interlock after which the operation may be repeated.

During the operation it will be noted that it is impossible for the operator to operate the discharge lever to remove the bag before it is completely filled, or filled to counterbalance the weight 26. Thus unintentional short weighing is prevented. The operation of these machines is very rapid and the operator is busy observing the various chairs to see whether they are on the downward move and ready to be operated, he having usually two to three machines to attend to at one time. Consequently, his hand is grasping the handle 43 as soon as possible in order to remove the filled bag. But he cannot pull the handle toward him before the hooks 44 and 47 have become disengaged, and what is of particular importance in this invention, he cannot unintentionally short weigh by pressing down upon the handle, which he is apt to do, because such pressure does not affect the weighing operation.

It will also be noted as one of the features of this invention that the discharge lever remains stationary during the weighing operation, while in several makes of machines of this kind, the discharge lever and chair move together.

The machine is not limited to the exact form shown and described and the invention may be embodied in other structures without departing from the principle of the invention or the scope of the claims.

I claim:—

1. In a bag filling machine a weighing mechanism, a bag support thereon, means mounted independent of said weighing mechanism for removing the bag therefrom.

2. In a bag filling machine a weighing mechanism, a bag support thereon, means mounted independent of said weighing mechanism for removing the bag therefrom and means preventing said removal before the bag has been filled with a predetermined quantity of material.

3. In a bag filling machine a weighing mechanism, a bag support thereon, means mounted independent of said weighing mechanism for removing the bag therefrom and automatic means preventing said removal before the bag has been filled with a predetermined quantity of material.

4. In a bag filling machine a weighing mechanism, a bag support thereon, means pivoted independent of said weighing mechanism for removing the bag therefrom and means on said weighing mechanism and on said removing means for preventing operation of the latter before the bag has been filled with a predetermined quantity of material.

5. In a bag filling machine a weighing mechanism, a bag support thereon, a discharge lever for removing the bag therefrom when the bag has been filled with a predetermined quantity of material and means for mounting said discharge lever separate from the said weighing mechanism.

6. In a bag filling machine a weighing mechanism, a bag support thereon, a discharge device for removing the bag therefrom when the bag has been filled with a predetermined quantity of material, locking means for preventing premature operation of said discharge device and means for supporting the latter independent of said weighing mechanism.

Signed at Devils Slide, in the county of Morgan and State of Utah, this eleventh day of October, A. D. 1915.

ALEXANDER V. JENSEN.

Witnesses:
 EDWIN A. WILDE,
 J. A. HATCH.